(12) United States Patent
Park et al.

(10) Patent No.: US 7,763,220 B2
(45) Date of Patent: Jul. 27, 2010

(54) REFORMER, FUEL CELL SYSTEM HAVING THE SAME, AND METHOD OF MANUFACTURING THE SAME

(75) Inventors: Zin Park, Suwon-si (KR); Ju-Yong Kim, Suwon-si (KR); Hyun-Jeong Lim, Suwon-si (KR); Ji-Seong Han, Suwon-si (KR); Ho-Jin Kweon, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1003 days.

(21) Appl. No.: 11/166,353

(22) Filed: Jun. 23, 2005

(65) Prior Publication Data
US 2006/0008684 A1 Jan. 12, 2006

(30) Foreign Application Priority Data
Jun. 29, 2004 (KR) .................. 10-2004-0049294

(51) Int. Cl.
*B01J 8/02* (2006.01)
*B01J 8/04* (2006.01)
(52) U.S. Cl. .................. 422/211; 422/171; 422/177; 422/187; 422/188; 422/190; 422/189; 48/61; 48/127.9; 429/17; 429/19; 429/20
(58) Field of Classification Search .................. 422/198, 422/211, 190, 194, 191, 192, 187; 48/127.1
See application file for complete search history.

(56) References Cited

U.S. PATENT DOCUMENTS 5,270,127 A * 12/1993 Koga et al. .................. 429/17

7,326,669 B2 * 2/2008 He et al. .................. 502/327
2002/0131919 A1 * 9/2002 DeBellis et al. .................. 422/188

FOREIGN PATENT DOCUMENTS

JP 2-80301 3/1990

(Continued)

OTHER PUBLICATIONS

Patent Abstracts of Japan, Publication No. 02-080301, dated Mar. 20, 1990, in the name of Hiroshi Yoshioka et al.

*Primary Examiner*—Alexa D. Neckel
*Assistant Examiner*—Kaity V. Handal
(74) *Attorney, Agent, or Firm*—Christie, Parker & Hale, LLP

(57) ABSTRACT

A fuel cell system includes: a reformer adapted to generate hydrogen from a fuel containing hydrogen through a chemical catalytic reaction using thermal energy; at least one electricity generator adapted to generate electric energy through an electrochemical reaction of hydrogen and oxygen; a fuel supply unit adapted to supply the fuel to the reformer; and an air supply unit adapted to supply oxygen to the reformer and the at least one electricity generator. The reformer includes a plurality of plates stacked with each other and forming at least one passage adapted to allow a fuel or a gas to flow therethrough and at least one catalyst layer coated on inner surfaces of the at least one passage. In the reformer, the at least one catalyst layer is formed to have a plurality of grooves extending substantially in a same direction as of the at least one passage.

10 Claims, 8 Drawing Sheets

FOREIGN PATENT DOCUMENTS

| | | |
|---|---|---|
| JP | 05-043201 A | 2/1993 |
| JP | 05-047402 A | 2/1993 |
| JP | 10-501737 A | 2/1998 |
| JP | 2001-321679 A | 11/2001 |
| JP | 2002-511383 A | 4/2002 |
| JP | 2004-026526 A | 1/2004 |

* cited by examiner

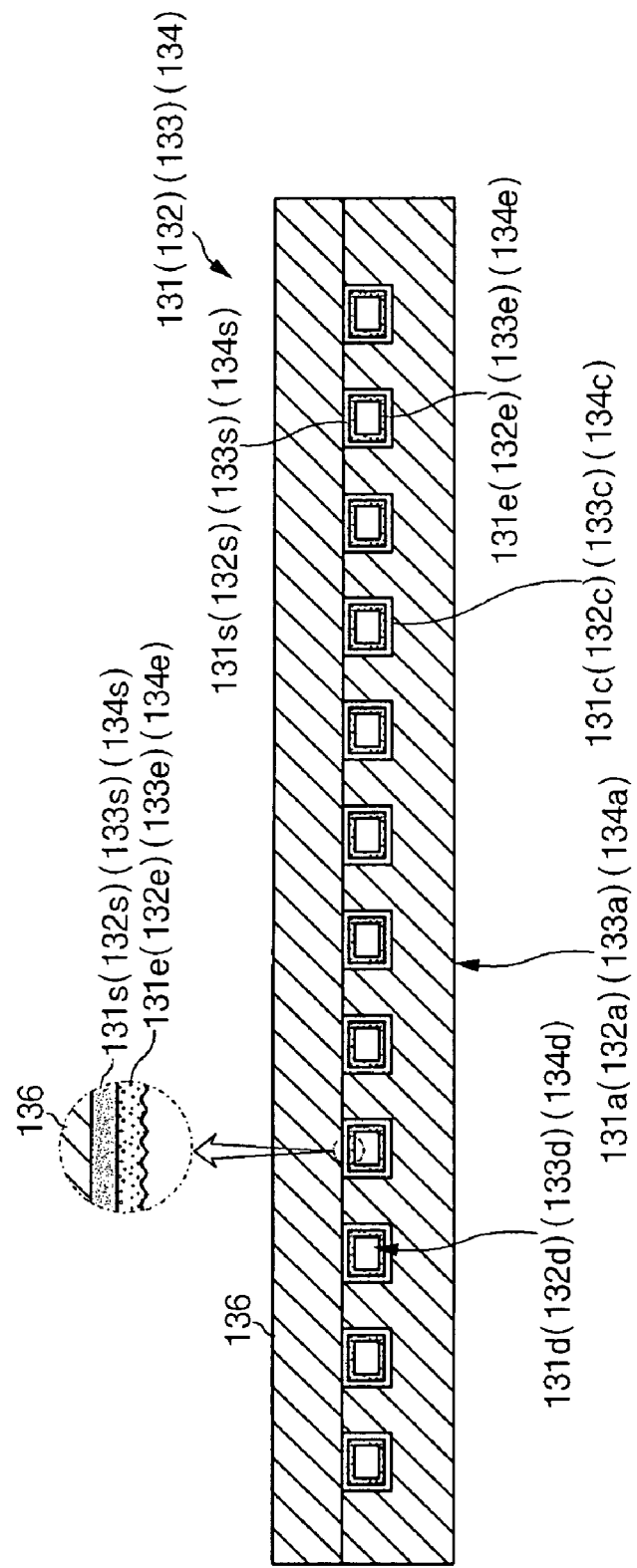

US 7,763,220 B2

REFORMER, FUEL CELL SYSTEM HAVING THE SAME, AND METHOD OF MANUFACTURING THE SAME

CROSS-REFERENCE TO RELATED APPLICATION

This application claims priority to and the benefit of Korean Patent Application 10-2004-0049294 filed in the Korean Intellectual Property Office on Jun. 29, 2004, the entire content of which is incorporated herein by reference.

FIELD OF THE INVENTION

The present invention relates to a fuel cell system and more particularly to a plate type reformer for a fuel cell system.

BACKGROUND OF THE INVENTION

A fuel cell is an electricity generating system that directly converts chemical reaction energy of oxygen and hydrogen contained in hydrocarbon materials such as methanol, ethanol, or natural gas into electric energy.

A polymer electrolyte membrane fuel cell (hereinafter, referred to as PEMFC) has been developed recently which has excellent output characteristics, low operating temperatures, and fast starting and response characteristics. PEMFCs have a wide range of application, including mobile power sources for vehicles, distributed power sources for homes or buildings, and small-size power sources for electronic apparatuses.

A fuel cell system employing the PEMFC scheme includes a stack, a reformer, a fuel tank, and a fuel pump. The stack constitutes a main body of a fuel cell and the fuel pump supplies a fuel stored in the fuel tank to the reformer. Then, the reformer reforms the fuel to generate hydrogen and supplies hydrogen to the stack, which generates electric energy through an electrochemical reaction between the hydrogen and oxygen.

The reformer is a device for generating hydrogen from the fuel containing hydrogen through a catalytic chemical reaction using thermal energy. Generally, the reformer includes a heat source for generating the thermal energy, a reforming reactor for generating the hydrogen gas from the fuel using the thermal energy, and a carbon-monoxide reducer for reducing the concentration of carbon monoxide contained in the hydrogen gas.

In a conventional reformer of a fuel cell system, the heat source, the reforming reactor, and the carbon-monoxide reducer are each formed in a vessel shape and are connected and separated through pipes. Accordingly, it is difficult to compactly embody the fuel cell system and to rapidly deliver the thermal energy generated from the heat source to the reforming reactor, thereby deteriorating reaction efficiency and thermal efficiency of the entire fuel cell system.

SUMMARY OF THE INVENTION

An embodiment of the present invention provides a reformer which can be decreased in size and improve performance with a simple structure. According to another embodiment, a fuel cell system is provided having the reformer.

According to one embodiment of the present invention, there is provided a reformer of a fuel cell system including: a plurality of plates stacked with each other and forming at least one passage adapted to allow a material selected from the group consisting of a fuel and a gas to flow therethrough; and at least one catalyst layer coated on inner surfaces of the at least one passage, wherein the at least one catalyst layer is formed to have a plurality of grooves extending substantially in a same direction as of the at least one passage. Here, the gas includes air, oxygen gas, hydrogen gas and so on.

The at least one passage may include an inlet adapted to allow the material selected from the group consisting of the fuel and the gas to flow into the at least one passage and an outlet adapted to allow the material selected from the group consisting of the fuel and the gas to flow out from the at least one passage. The catalyst layer may have the grooves extending substantially in the same direction as of the at least one passage from the inlet to the outlet.

The catalyst layer may include a plurality of catalyst layers and the at least one passage may include a plurality of passages, and wherein each of the plurality of catalyst layers may be formed on entire inner surfaces of a corresponding one of the plurality of passages.

The plurality of plates and at least one catalyst layer constitute a plurality of reaction sections, and each of the plurality of reaction sections includes a plate of the plurality of plates having a channel, a cover plate of the plurality of plates contacting the plate having the channel to form a passage and a catalyst layer formed on inner surfaces of the passage, respectively. Here, the plurality of reaction sections may include a heat source adapted to generate thermal energy, a reforming reactor adapted to generate hydrogen gas from the fuel, and a carbon-monoxide reducer adapted to reduce a concentration of carbon monoxide contained in the hydrogen gas.

On the other hand, wherein the at least one catalyst layer may include a plurality of catalyst layers and the at least one passage may include a plurality of passages, and wherein a cover plate of the plurality of plates and at least two of the plurality of plates having a channel formed on one surface of each of the at least two of the plurality of plates may be stacked to form the plurality of passages and each of the plurality of catalyst layers may be formed on inner surfaces of a corresponding one of the passages to constitute a plurality of reaction sections.

The reaction sections may include a heat source adapted to generate thermal energy and a reforming reactor adapted to generate hydrogen gas from the fuel.

The plurality of plates may include: a first plate having a first channel; a second plate contacting one surface of the first plate and having a second channel; and a cover plate contacting one surface of the second plate. The plurality of catalyst layers may include: an oxidation catalyst layer formed on entire inner surfaces of one of the plurality of passages formed by the first channel and the second plate; and a reforming catalyst layer formed on entire inner surfaces of another one of the plurality of the passages formed by the second channel and the cover plate.

The reaction sections may further include at least one carbon-monoxide reducer adapted to reduce a concentration of carbon monoxide contained in the hydrogen gas.

The plurality of plates may include: a first plate having a first channel; a second plate contacting one surface of the first plate and having a second channel; a third plate contacting one surface of the second plate and having a third channel; a fourth plate contacting another surface of the first plate and having a fourth channel; and a cover plate contacting one surface of the third plate. Here, the plurality of catalyst layers may include: an oxidation catalyst layer formed on entire inner surfaces of a first one of the plurality of passages formed by the first channel and the second plate; a reforming catalyst layer formed on entire inner surfaces of a second one of the plurality of passages formed by the second channel and the third plate; a water-gas shift catalyst layer formed on entire inner surfaces of a third one of the plurality of passages formed by the third channel and the cover plate; and a preferential CO oxidation catalyst layer formed on entire inner surfaces of a fourth one of the plurality of passages formed by the fourth channel and the first plate.

According to one embodiment of the present invention, there is provided a method of manufacturing a reformer of a fuel cell system, the method including: preparing a cover plate and at least one plate having a channel formed on one surface of at least one plate; stacking and coupling the plate and the cover plate to form at least one passage; and wash-coating catalyst materials to form at least one catalyst layer on inner surfaces of the at least one passage.

The plate may be made of a material selected from the group consisting of stainless steel, copper, nickel, iron and combinations thereof.

The method may further include forming a support layer in the at least one passage after the stacking and coupling of the at least one plate and the cover plate to form the at least one passage and before the wash-coating of the catalyst materials.

The at least one support layer may include a material selected from the group consisting of alumina, silica, titania, and combinations thereof.

In the wash-coating of the catalyst materials, the at least one catalyst layer may be formed to have a plurality of grooves extending substantially in a same direction as from an inlet to an outlet of the at least one passage by spraying the catalyst materials into the at least one passage using a gas such as air with a predetermined gas pressure.

According to one embodiment of the present invention, there is provided a fuel cell system including: the reformer described above; at least one electricity generator adapted to generate electric energy through an electrochemical reaction of hydrogen and oxygen; a fuel supply unit adapted to supply the fuel to the reformer; and an air supply unit adapted to supply the oxygen to the reformer and the at least one electricity generator.

BRIEF DESCRIPTION OF THE DRAWINGS

The above and other features and advantages of the present invention will become more apparent by describing in detail exemplary embodiments thereof with reference to the attached drawings in which:

FIG. 8 is a cross-sectional view illustrating the coupled structure of the reformer shown in FIG. 7.

DETAILED DESCRIPTION

Hereinafter, exemplary embodiments of the present invention will be described in detail with reference to the attached drawings such that the present invention can be easily put into practice by those skilled in the art. However, the present invention is not limited to the exemplary embodiments, and may be embodied in various forms.

Figure 1:
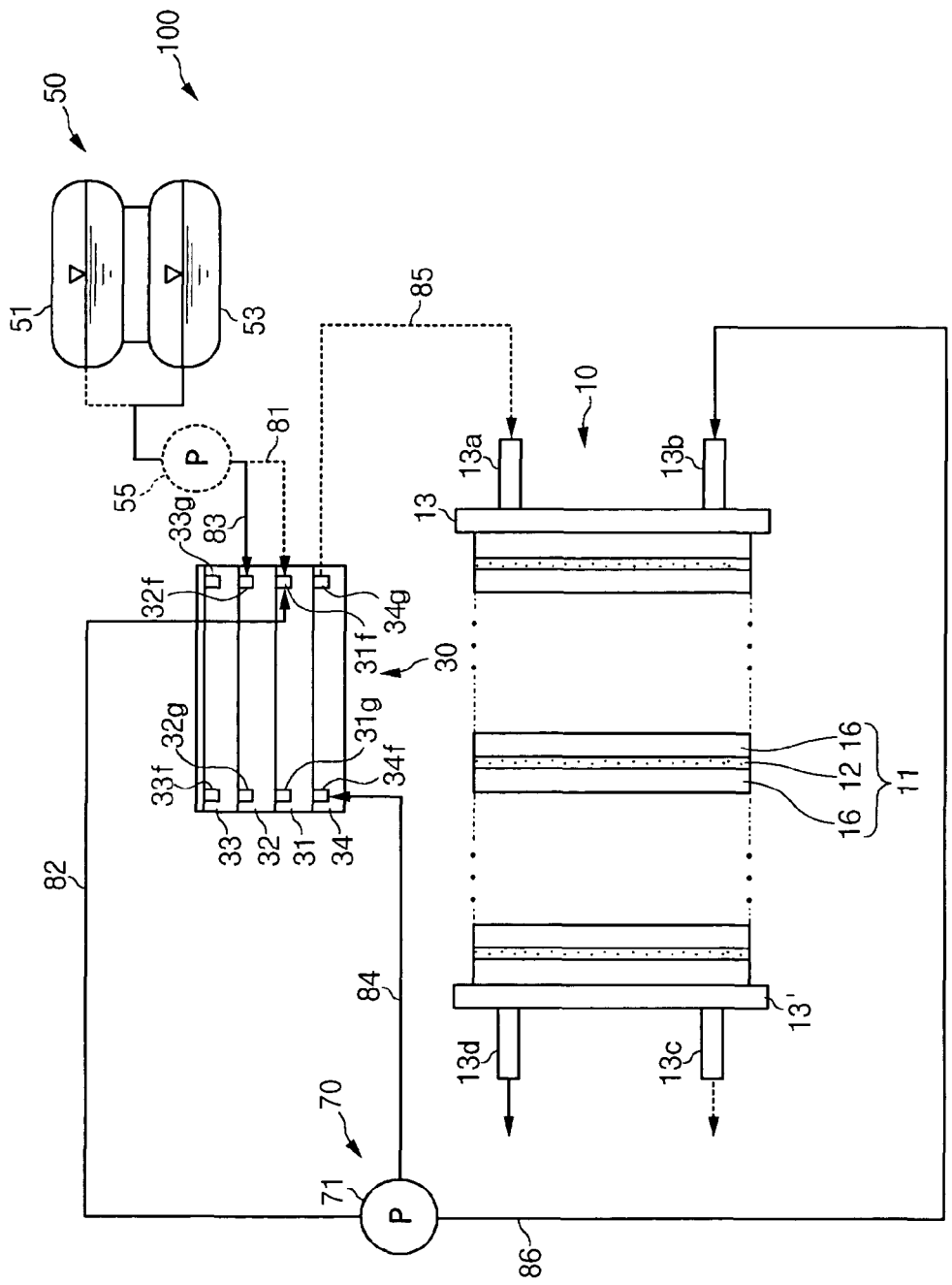
FIG. 1 is a schematic diagram illustrating an entire construction of a fuel cell system according to an embodiment of the present invention.

FIG. 1 is a schematic diagram illustrating an entire construction of a fuel cell system according to an embodiment of the present invention.

The fuel used to generate electricity in the fuel cell system 100 according to the present invention can include a liquid or gas hydrogen-containing fuel such as methanol, ethanol, or natural gas. However, liquid fuel is exemplified as the fuel in the following description.

The fuel cell system 100 may utilize pure oxygen stored in an additional storage device for reacting with hydrogen contained in the fuel or may utilize oxygen-containing air as the necessary oxygen source. However, the latter is exemplified in the following description.

Referring to FIG. 1, the fuel cell system 100 includes a reformer 30 for generating hydrogen from the fuel, a stack 10 for generating electric energy through an electrochemical reaction between hydrogen and oxygen contained in the air, a fuel supply unit 50 for supplying the fuel to the reformer 30, and an oxygen supply unit 70 for supplying oxygen to the stack 10 and the reformer 30.

The fuel cell system 100 according to the present embodiment employs a polymer electrolyte membrane fuel cell (PEMFC) scheme in which the reformer 30 generates hydrogen and supplies hydrogen to the stack 10, and the stack 10 generates the electric energy through the electrochemical reaction between hydrogen and oxygen.

The fuel supply unit 50 includes a first tank 51 for storing the fuel, a second tank 53 for storing water, and a fuel pump 55 connected to the first and second tanks 51 and 53. The oxygen supply unit 70 includes an air pump 71 for pumping air with a predetermined pumping power.

A structure of the reformer 30 generating hydrogen from the hydrogen-containing fuel will be first described with reference to FIGS. 1, 2, and 3, and then a structure of the stack 10 for generating the electric energy through the electrochemical reaction between hydrogen and oxygen will be described with reference to FIGS. 1 and 4.

Figure 2:
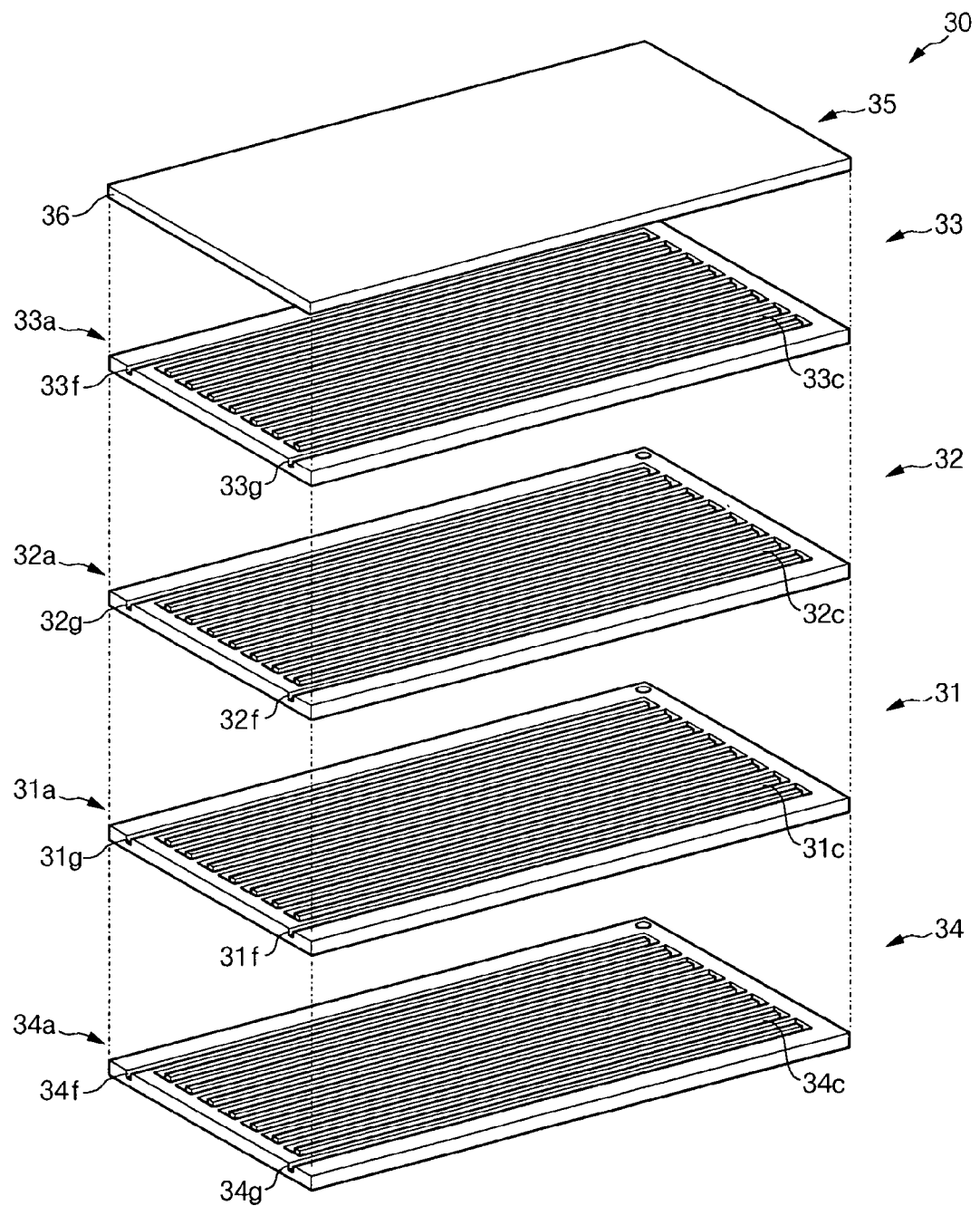
FIG. 2 is an exploded perspective view illustrating a structure of a reformer according to an embodiment of the present invention.
Figure 3:
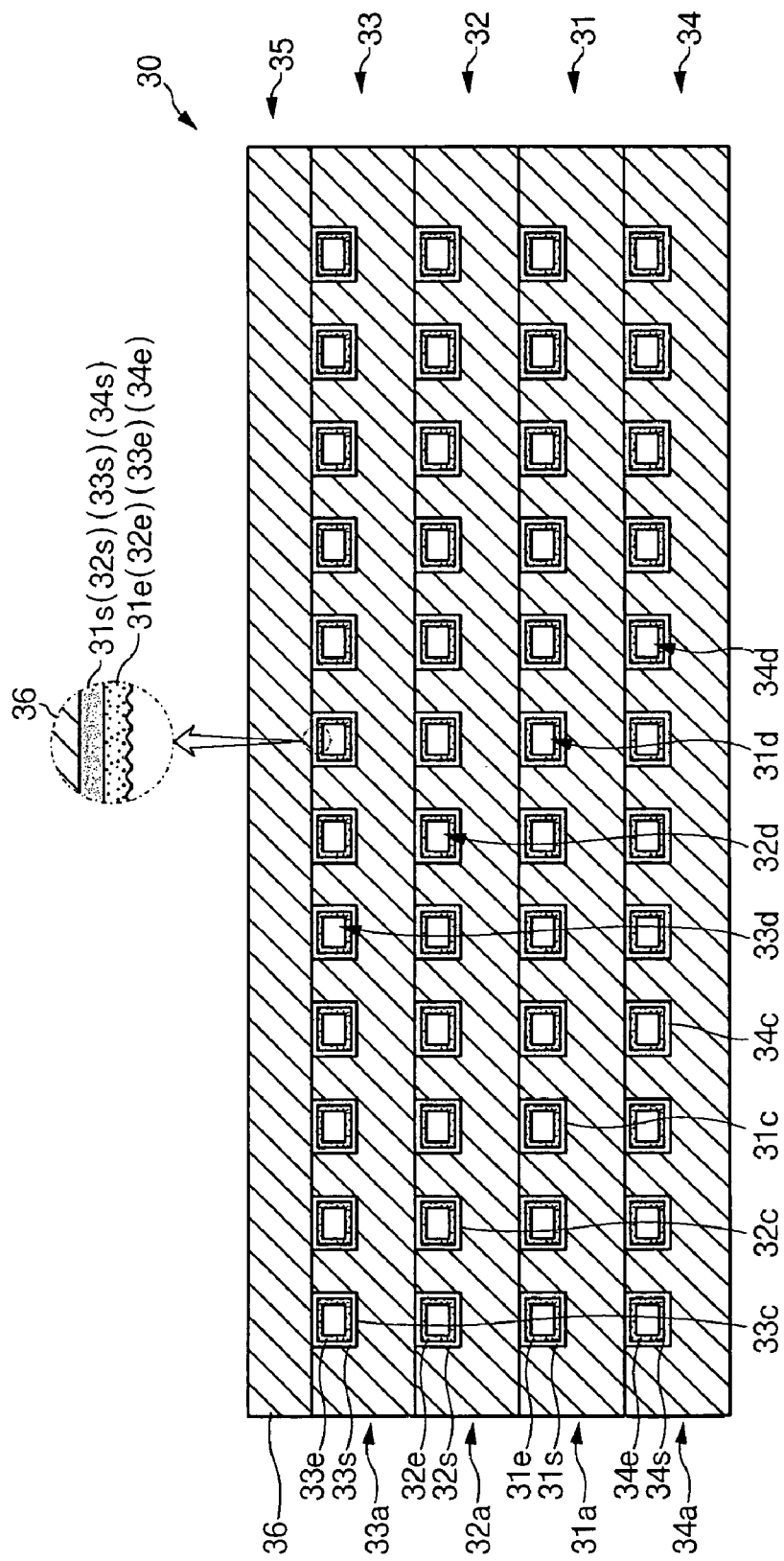
FIG. 3 is a cross-sectional view illustrating the coupled structure of the reformer shown in FIG. 2.

FIG. 2 is an exploded perspective view illustrating the structure of the reformer 30 according to an embodiment of the present invention, and FIG. 3 is a cross-sectional view illustrating the coupled structure of the reformer 30 shown in FIG. 2.

The reformer 30 according to the present invention reforms the fuel through a catalytic chemical reaction using thermal energy from a reaction such as a steam reforming reaction, a partial oxidation reaction, or an auto-thermal reaction to generate hydrogen gas, and reduces the concentration of carbon monoxide contained in the hydrogen gas by using a catalytic reaction such as a water-gas shift reaction and a preferential CO oxidation reaction or a purification process such as with a separating membrane.

The reformer 30 according to the present embodiment includes a heat source 31, a reforming reactor 32, and first and second carbon-monoxide reducers 33 and 34. The heat source 31 generates the thermal energy necessary for the catalytic chemical reaction, the reforming reactor 32 absorbs the thermal energy generated from the heat source 31, vaporizes the fuel, and generates the hydrogen gas. Also, the first carbon-monoxide reducer 33 generates additional hydrogen gas to reduce the concentration of carbon monoxide contained in the hydrogen gas through a water-gas shift reaction (WGS). The second carbon-monoxide reducer 34 reduces the concentration of carbon monoxide contained in the hydrogen gas through a preferential CO oxidation (PROX) catalytic reaction of air and the hydrogen gas discharged from the first carbon-monoxide reducer 33. In one embodiment of the reformer 30, the first carbon-monoxide reducer 33 is the primary reducer of the concentration of the carbon monoxide, and the secondary reducer 34 is the secondary reducer of the concentration of the carbon monoxide.

The reformer 30 may further include a vaporization section (not shown) for vaporizing a mixture of the fuel and water using the thermal energy generated from the heat source 31. The vaporization section may be disposed between the heat source 31 and the reforming reactor 32, which belongs to the scope of the present invention.

According to the present embodiment, the reformer 30 has a stacked structure of the heat source 31, the reforming reactor 32, the first carbon-monoxide reducer 33, the second carbon-monoxide reducer 34, and a cover 35. That is, plates 31a, 32a, 33a, 34a, and 36 are stacked to form passages 31d, 32d, 33d, 34d; and catalyst layers 31e, 32e, 33e, and 34e for promoting the corresponding reactions are formed on the inner surfaces of the passages 31d, 32d, 33d, 34d, respectively. The respective reaction sections 31, 32, 33, and 34 will be described in more detail by explaining the structures of the plural plates 31a, 32a, 33a, 34a, and 36 and then explaining the catalyst layers 31e, 32e, 33e, and 34e formed thereon.

A first channel 31c for enabling the flow of the fuel and the air is formed on one surface of the first plate 31a. An inlet 31f, into which the liquid fuel and the air flow, is formed at one or a start end of the first channel 31c; and an outlet 31g, from which the combusted gas of the liquid fuel and the air flows, is formed at another or a finish end of the first channel 31c. The inlet 31f and the first tank 51 can be connected through a first supply line 81, and the inlet 31f and the air pump 71 can be connected through a second supply line 82.

A second channel 32c for enabling the flow of the fuel is formed in a top surface of the second plate 32a. An inlet 32f, into which the mixture of the fuel and water from the first and second tanks 51 and 53 (hereinafter, referred to as the fuel mixture) flows, is formed at a start end of the second channel 32c; and an outlet 32g, from which the hydrogen gas generated from the fuel mixture flows, is formed at a finish end of the second channel 32c. The inlet 32f and the first and second tanks 51 and 53 can be connected through a third supply line 83. The inlet 32f can be connected to the outlet 31g of the first plate 31a through an additional pipe (not shown).

A third channel 33c for enabling the flow of the hydrogen gas generated from the reforming reactor 32 is formed in a top surface of the third plate 33a. An inlet 33f, into which the hydrogen gas flows, is formed at a start end of the third channel 33c; and an outlet 33g, from which the hydrogen gas of which the concentration of carbon monoxide that has been primarily reduced flows, is formed at a finish end of the third channel 33c. The inlet 33f may be connected to the outlet 32g of the second plate 32a through an additional connection mechanism (not shown) such as a pipe or a penetrated hole.

A fourth channel 34c for enabling the flow of the hydrogen gas is formed in a top surface of the fourth plate 34a. An inlet 34f, into which the hydrogen gas flows, is formed at a start end of the fourth channel 34c; and an outlet 34g, from which the hydrogen gas of which the concentration of carbon monoxide that has been secondarily reduced flows, is formed at a finish end of the fourth channel 34c. The inlet 34f and the air pump 71 can be connected through a fourth supply line 84 and the inlet 34f can be connected to the outlet 33g of the third plate 33a through an additional connection mechanism (not shown), such as a pipe or a penetrated hole. The outlet 34g and the stack 10 described later can be connected through a fifth supply line 85.

The respective channels 31c, 32c, 33c, and 34c are formed in the respective plates 31a, 32a, 33a, and 34a to have parallel straight flow lines with a predetermined gap between adjacent flow lines on the top surfaces of the respective plates 31a, 32a, 33a, and 34a. The adjacent flow lines of each of the respective channels 31c, 32c, 33c, and 34c are connected at the ends such that the flow lines together define a serpentine flow channel. Of course, the arrangement of the channels 31c, 32c, 33c, and 34c is not limited to this serpentine shape.

Referring now more specifically to FIG. 3, the reformer 30 according to the present embodiment can be constructed by sequentially stacking the second plate 32a and the third plate 33a on the first plate 31a and stacking the fourth plate 34a under the first plate 31a. The cover plate 36 used as the cover 35 can be coupled to the top surface of the third plate 33a and positioned at an uppermost side of the reformer 30. Here, the cover plate 36 is shown to be a plate in which no channel is formed for exemplary purposes, and the present invention is not thereby limited.

The respective plates 31a, 32a, 33a, and 34a and the cover plate 36 can be made of metal such as stainless steel, copper, nickel, and/or iron and have approximately a rectangular plate shape.

Between the first plate 31a and the second plate 32a, the first channel 31c of the first plate 31a and a bottom surface of the second plate 32a form a first passage 31d for passing the liquid fuel and the air.

A support layer 31s for supporting an oxidation catalyst layer 31e is formed on inner surfaces of the first passage 31d. The support layer 31s is a carrier for supporting the oxidation catalyst layer 31e and can be made of alumina ($Al_2O_3$), silica ($SiO_2$), and/or titania ($TiO_2$). The oxidation catalyst layer 31e for promoting the oxidation reaction of the fuel and the air is formed on the support layer 31s.

Here, the support layer 31s may be formed after coupling the first plate 31a and the second plate 32a, or the second plate 32a and the first plate 31a may be coupled after forming the support layer 31s on inner surfaces of the first channel 31c of the first plate 31a.

In the present embodiment, the oxidation catalyst layer 31e can be wash-coated on the inner surfaces of the first passage 31d; that is, the oxidation catalyst layer 31e can be coated on the support layer 31s, to have grooves extending substantially in a same direction as of the first passage 31d. Here, the washing-coating method is a coating method of forming the catalyst layer 31e with a predetermined thickness on the entire inner surfaces of the first passage 31d by spraying catalyst materials forming the catalyst layer 31e through the inlet 31f with a predetermined gas pressure using a gas such as air and then discharging the catalyst materials from the outlet 31g. That is, the catalyst layer 31e can be formed on the support layer 31s in a state when the first plate 31a and the second plate 32a are coupled to each other.

In this way, the catalyst layer 31e formed using the wash-coating method results in the grooves that extend substantially in the same direction as of the entire first passage 31d from the inlet 31f of the first channel 31c to the outlet 31g of the first channel 31c. Therefore, as shown in the FIG. 3, the surface of the catalyst layer 31e is not flat and has an uneven shape.

Between the second plate 32a and the third plate 33a, the second channel 32c of the second plate 32a and a bottom surface of the third plate 33a form a second passage 32d for passing the fuel.

A support layer 32s is formed on inner surfaces of the second passage 32d and a reforming catalyst layer 32e for promoting the steam reforming reaction of the fuel is formed on the support layer 32s. The support layer 32s is substantially the same as the support layer 31s formed on the inner surface of the first passage 31d and will not be described in more detail again.

The reforming catalyst layer 32e can be wash-coated on the support layer 32s so as to have grooves extending substantially in a same direction as of the entire second passage 32d from the inlet 32f to the outlet 32g.

Between the third plate 33a and the cover plate 36, the third channel 33c of the third plate 33a and a cover surface of the cover plate 36 form a third passage 33d for passing the hydrogen gas discharged from the second passage 32d.

A support layer 33s similar to the support layer 31s described above is formed on inner surfaces of the third passage 33d, and a water-gas shift catalyst layer 33e for promoting the water-gas shift reaction of the fuel is formed on the support layer 33s. The water-gas shift catalyst layer 33e can be wash-coated on the support layer 33s so as to have grooves extending substantially in a same direction as of the entire third passage 33d from the inlet 33f to the outlet 33g.

Between the fourth plate 34a and the first plate 31a, the fourth channel 34c of the fourth plate 34a and a bottom surface of the first plate 31a form a fourth passage 34d for passing the hydrogen gas discharged from the third passage 33d.

A support layer 34s is formed on inner surfaces of the fourth passage 34d and a preferential CO oxidation catalyst layer 34e for promoting the preferential CO oxidation reaction of the hydrogen gas and the air is formed on the support layer 34s. The preferential CO oxidation catalyst layer 34e can be wash-coated on the support layer 34s so as to have grooves extending substantially in a same direction as of the entire fourth passage 34d from the inlet 34f to the outlet 34g.

That is, in the present embodiment, when the catalyst layers 31e, 32e, 33e, and 34e are wash-coated on the inner surfaces of the respective passages 31d, 32d, 33d, and 34d, catalyst particles of the catalyst layers 31e, 32e, 33e, and 34e are firmly attached to respective surfaces of the support layers 31s, 32s, 33s, and 34s. Accordingly, it is possible to prevent the catalyst particles of the catalyst layers 31e, 32e, 33e, and 34e from being separated from the support layers 31s, 32s, 33s, and 34s even when relatively strong mechanical or thermal impacts have been applied. Thus, an adhesive stability and impact endurance of the catalyst layers 31e, 32e, 33e, and 34e is improved.

Figure 4:
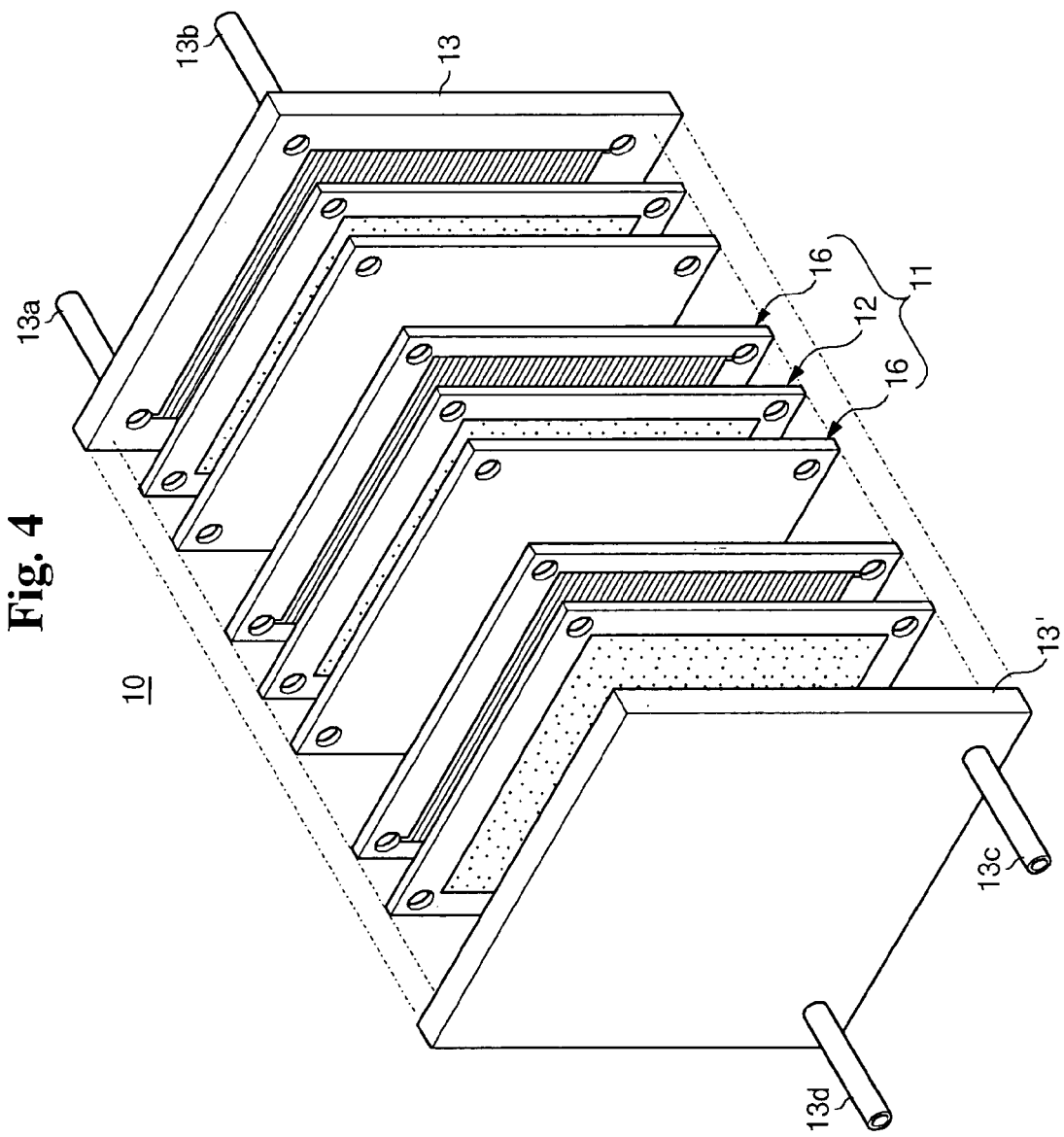
FIG. 4 is an exploded perspective view illustrating a structure of a stack shown in FIG. 1.

FIG. 4 is an exploded perspective view illustrating a structure of the stack shown in FIG. 1.

Referring to FIGS. 1 and 4, the stack 10 of the fuel cell system 100 has electricity generators 11 that are successively stacked and for generating electric energy through the oxidation and reduction reactions of hydrogen generated from the reformer 30 and oxygen contained in the air.

Each of the electricity generators 11 is a unit of a fuel cell for generating electricity in which separators 16 are disposed on both surfaces of a membrane-electrode assembly (MEA) 12.

The MEA 12 has a predetermined active area where the electrochemical reaction of hydrogen and oxygen occurs. The MEA 12 includes an anode electrode formed on one surface, a cathode electrode formed on the other surface, and an electrolyte membrane formed between the anode and cathode electrodes.

The anode electrode converts hydrogen into hydrogen ions (protons) and electrons through an oxidation reaction of the hydrogen. The cathode electrode generates heat and moisture with a predetermined temperature through a reduction reaction of the hydrogen ions and the oxygen. The electrolyte membrane performs an ion exchange function for moving the hydrogen ions generated from the anode electrode to the cathode electrode.

Separators 16 function as conductors for connecting the anode electrode and the cathode electrode in series to each other, and function as passages for supplying the hydrogen gas and the air necessary for the oxidation and reduction reactions of the MEA 12 to the anode electrode and the cathode electrode.

More specifically, a hydrogen passage for supplying the hydrogen gas to the anode electrode is formed in the surface of the separator 16 coming in close contact with the anode electrode of the MEA 12, and an air passage for supplying the air to the cathode electrode is formed in the surface of the MEA 12, coming in close contact with the cathode electrode.

The outermost sides of the stack 10 may be provided with additional pressing plates 13 and 13' for bringing the electricity generators 11 into close contact with each other. The stack 10 according to the present invention may be constructed such that the separators 16 located at the outermost sides of the plurality of electricity generators 11 carry out the function as the pressing plates 13 and 13', without providing the pressing plates 13 and 13'. The stack 10 may be constructed such that the pressing plates 13 and 13' have a function specific to the separators 16 to be described in more detail below, in addition to the function of bringing the plurality of electricity generators 11 into close contact with each other.

One pressing plate 13 is provided with a first injection hole 13a for supplying the hydrogen gas to the hydrogen passage of the separators 16 and a second injection hole 13b for supplying the air to the air passage of the separators 16. The other pressing plate 13 is provided with a first discharge hole 13c for discharging the non-reacted hydrogen gas in the anode electrode of the MEA 12 and a second discharge hole 13d for discharging the non-reacted air containing the moisture generated through the coupling reaction between hydrogen and oxygen in the cathode electrode of the MEA 12.

The second injection hole 13b and the air pump 71 can be connected through a sixth supply line 86. The first discharge hole 13c can be connected to the inlet 31f of the first plate 31a through an additional pipe (not shown).

Operations of the fuel cell system according to the embodiment of the present invention will be now described in more detail.

First, the fuel pump 55 supplies the fuel stored in the first tank 51 to the first passage 31d of the reformer 30 through the first supply line 81. At the same time, the air pump 71 supplies the air to the first passage 31d through the second supply line 82. Then, while flowing through the first passage 31d, the liquid fuel and the air result in the oxidation catalytic reaction with the oxidation catalyst layer 31c. Accordingly, the heat source 31 generates a reaction heat with a predetermined temperature through the oxidation catalytic reaction of the fuel and the air. As a result, the thermal energy generated from the heat source 31 is delivered to the reforming reactor 32 and the carbon-monoxide reducers 33 and 34 and preheats the entire reformer 30.

Next, when the preheating of the reformer 30 is completed, the fuel pump 55 supplies the fuel stored in the first tank 51 and the water stored in the second tank 53 to the second passage 32d of the reformer 30 through the third supply line 83. Then, the fuel and the water are vaporized with the thermal energy supplied from the heat source 31 while flowing through the second passage 32d. At this time, the reforming reactor 32 generates the hydrogen gas from the vaporized fuel through the steam reforming reaction with the reforming catalyst layer 32e. Since the reforming reactor 32 cannot completely carry out the steam reforming catalytic reaction, the reforming reactor 32 generates the hydrogen gas containing carbon monoxide as a byproduct.

Next, the hydrogen gas containing carbon monoxide flows through the third passage 33d of the reformer 30. Then, the first carbon-monoxide reducer 33 generates additional hydrogen gas through the water-gas shift catalytic reaction with the water-gas shift catalyst layer 33e and primarily reduces the concentration of carbon monoxide contained in the hydrogen gas.

Subsequently, the hydrogen gas passing through the third passage 33d flows through the fourth passage 34d of the reformer 30. At the same time, the air pump 71 supplies the air to the fourth passage 34d through the fourth supply line 84. Then, the second carbon-monoxide reducer 34 further reduces the concentration of carbon monoxide contained in the hydrogen gas through the preferential CO oxidation catalytic reaction with the preferential CO oxidation catalyst layer 34e and discharges the hydrogen gas.

Subsequently, the hydrogen gas is supplied to the first injection hole 13a of the stack 10 through the fifth supply line 85. At the same time, the air pump 71 supplies the air to the second injection hole 13b of the stack 10 through the sixth supply line 86.

Then, the hydrogen gas is supplied to the anode electrode of the MEA 12 through the hydrogen passage of the passages 17 of the separators 16. The air is supplied to the cathode electrode of the MEA 12 through the air passage of the passages 17 of the separators 16.

The anode electrode decomposes the hydrogen gas into electrons and protons (hydrogen ions) through the oxidation reaction of the hydrogen gas. The protons are moved to the cathode electrode through the electrolyte membrane, and the electrons are moved to the cathode electrode of the neighboring MEA 12 through the separators 16, and not through the electrolyte membrane. The flow of electrons generates a current, and heat and water are also generated by the stack 10 as byproducts.

Since a fuel cell system according to the present embodiment has a stacked structure of plates, the entire fuel cell system can be compact. Accordingly, a manufacturing process can be simplified, thereby further improving the productivity of the fuel cell system.

In a fuel cell system according to the present invention, it is possible to rapidly deliver thermal energy necessary for various reactions of a fuel. Therefore, it is possible to enhance a reaction efficiency and a thermal efficiency of an entire reformer of the fuel cell system.

Now, a method of manufacturing the reformer 30 according to the present embodiment will be described in more detail with reference to FIG. 5.

Figure 5:
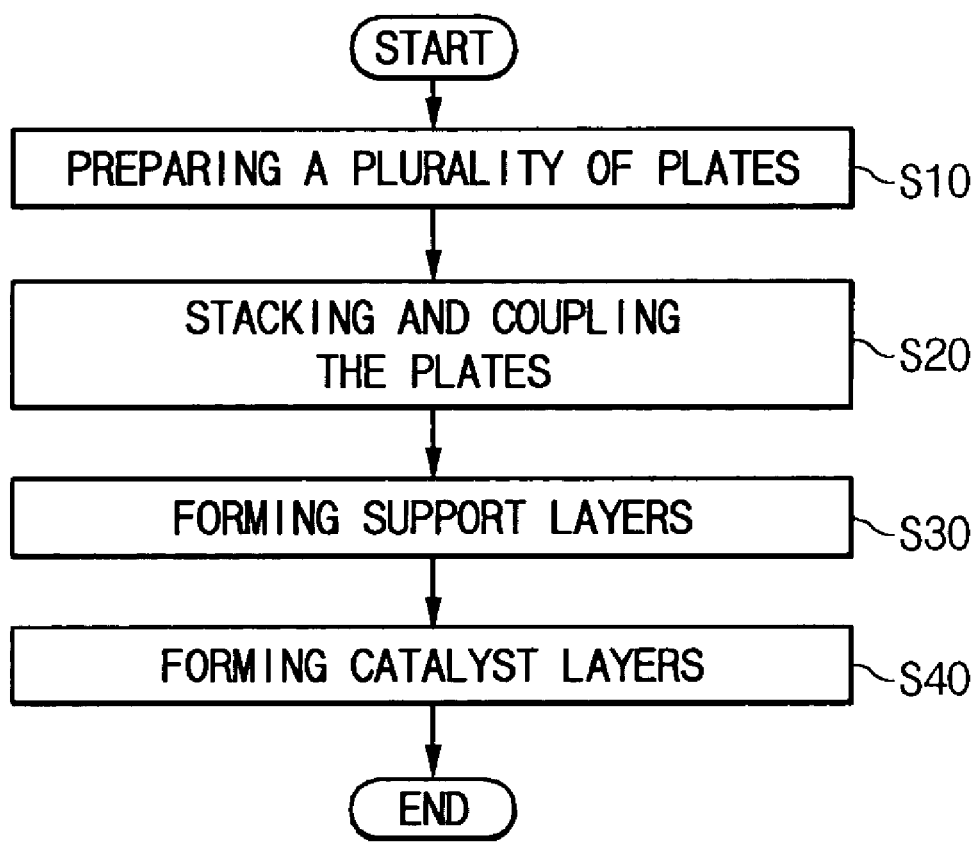
FIG. 5 is a flowchart illustrating a method of manufacturing a reformer according to an embodiment of the present invention.

FIG. 5 is a flowchart illustrating a method of manufacturing the reformer 30 according to an embodiment of the present invention.

First, the cover plate 36 and the plates 31a, 32a, 33a, and 34a in which the channels 31c, 32c, 33c, and 34c are formed are prepared (S10). The plates 31a, 32a, 33a, and 34a can be made of stainless steel, copper, nickel, and/or iron. A variety of methods such as an anisotropic etching method can be used to form the channels 31c, 32c, 33c, and 34c in the plates 31a, 32a, 33a, and 34a.

Subsequently, the second plate 32a, the third plate 33a, and the cover plate 36 are sequentially stacked on or above the first plate 31a and the fourth plate 34a is stacked under or below the first plate 31a. The plates are then coupled by coupling joints (S20).

Next, the support layers 31s, 32s, 33s, and 34s made of alumina ($Al_2O_3$), silica ($SiO_2$) and/or titania ($TiO_2$) are formed on the entire inner surfaces of the passages 31d, 32d, 33d, and 34d (S30).

Subsequently, the wash-coating method is used to form the catalyst layers 31e, 32e, 33e, and 34e on the support layers 31s, 32s, 33s, and 34s (S40).

In the present invention, by coupling the plural plates 31a, 32a, 33a, 34a, and 36 and then forming the catalyst layers 31e, 32e, 33e, and 34e, the catalyst layers 31e, 32e, 33e, and 34e can be formed on the entire inner surfaces of the passages 31d, 32d, 33d, and 34d. Therefore, the contact surface areas between the fuel or the gas and the catalyst layers 31e, 32e, 33e, and 34e can be enlarged, thereby enhancing the entire reaction efficiency of the fuel cell system. In addition, by forming the catalyst layers 31e, 32e, 33e, and 34e using the wash-coating method, it is possible to form the catalyst layers 31e, 32e, 33e, and 34e with the respective groves that extend substantially in the same directions as of the passages 31d, 32d, 33d, and 34d, respectively.

Modified examples of the first embodiment of the present invention will be described below. In the modified examples, elements that are substantially the same as those described for the embodiment of FIGS. 2 and 3 will not be described again.

Figure 6:
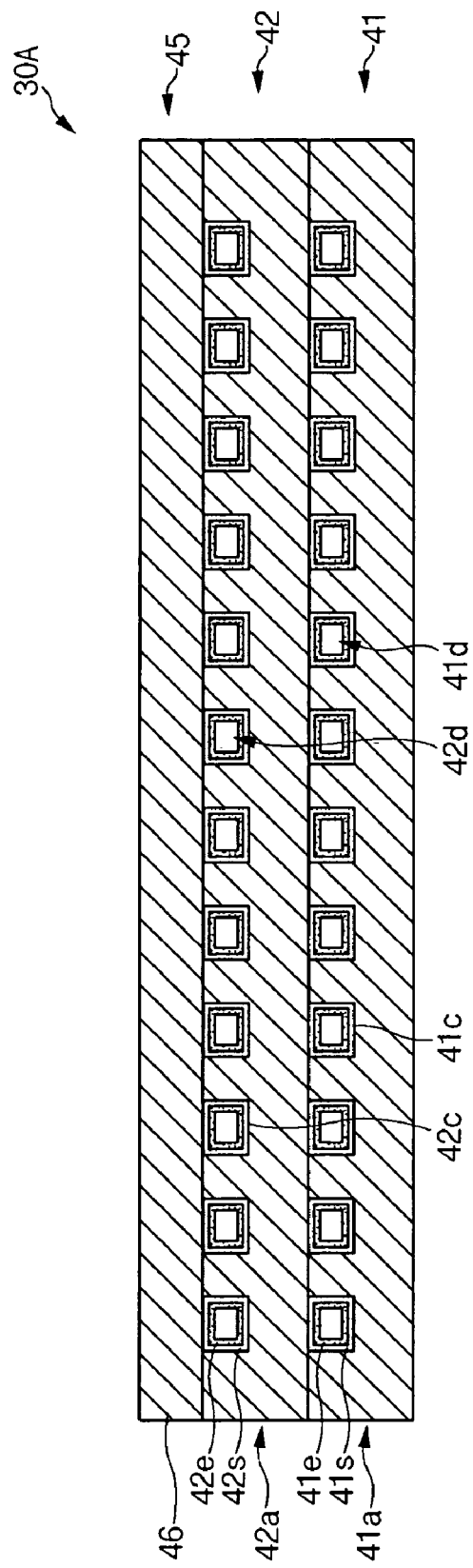
FIG. 6 is an exploded perspective view illustrating a structure of a reformer according to a first modified example of the present invention.

FIG. 6 is an exploded perspective view illustrating a structure of a reformer according to a first modified example of the present invention.

Referring to FIG. 6, the reformer 30A according to the present modified example is formed by sequentially stacking a reforming reactor 42 and a cover 45 on a heat source 41. Specifically, the reformer 30A has a structure that a second plate 42a is stacked on a first plate 41a and a cover plate 46 is stacked on the first plate 41a.

Between the first plate 41a and the second plate 42a, the first channel 41c of the first plate 41a and a bottom surface of the second plate 42a form a first passage 41d. A support layer 41s is formed on inner surfaces of the first passage 41d and an oxidation catalyst layer 41e is formed on the support layer 41s. The oxidation catalyst layer 41e can be wash-coated on the support layer 41s so as to have grooves that extend substantially in a direction from the inlet (not shown) to the outlet (not shown) of the entire first passage 41d.

Between the second plate 42a and the cover plate 46, the second channel 42c of the second plate 42a and a cover surface of the cover plate 46 form a second passage 42d. A support layer 42s is formed on inner surfaces of the second passage 42d and a reforming catalyst layer 42e is formed on the support layer 42s. The reforming catalyst layer 42e can be wash-coated on the support layer 42s so as to have grooves that extend substantially in a direction from the inlet (not shown) to the outlet (not shown) of the entire second passage 42d.

That is, in the present modified example, by minimizing the number of elements and including the heat source 41 and the reforming reactor 42 necessary for the reforming reaction, it is possible to further enhance the structural advantages of the reformer 30A.

Figure 7:
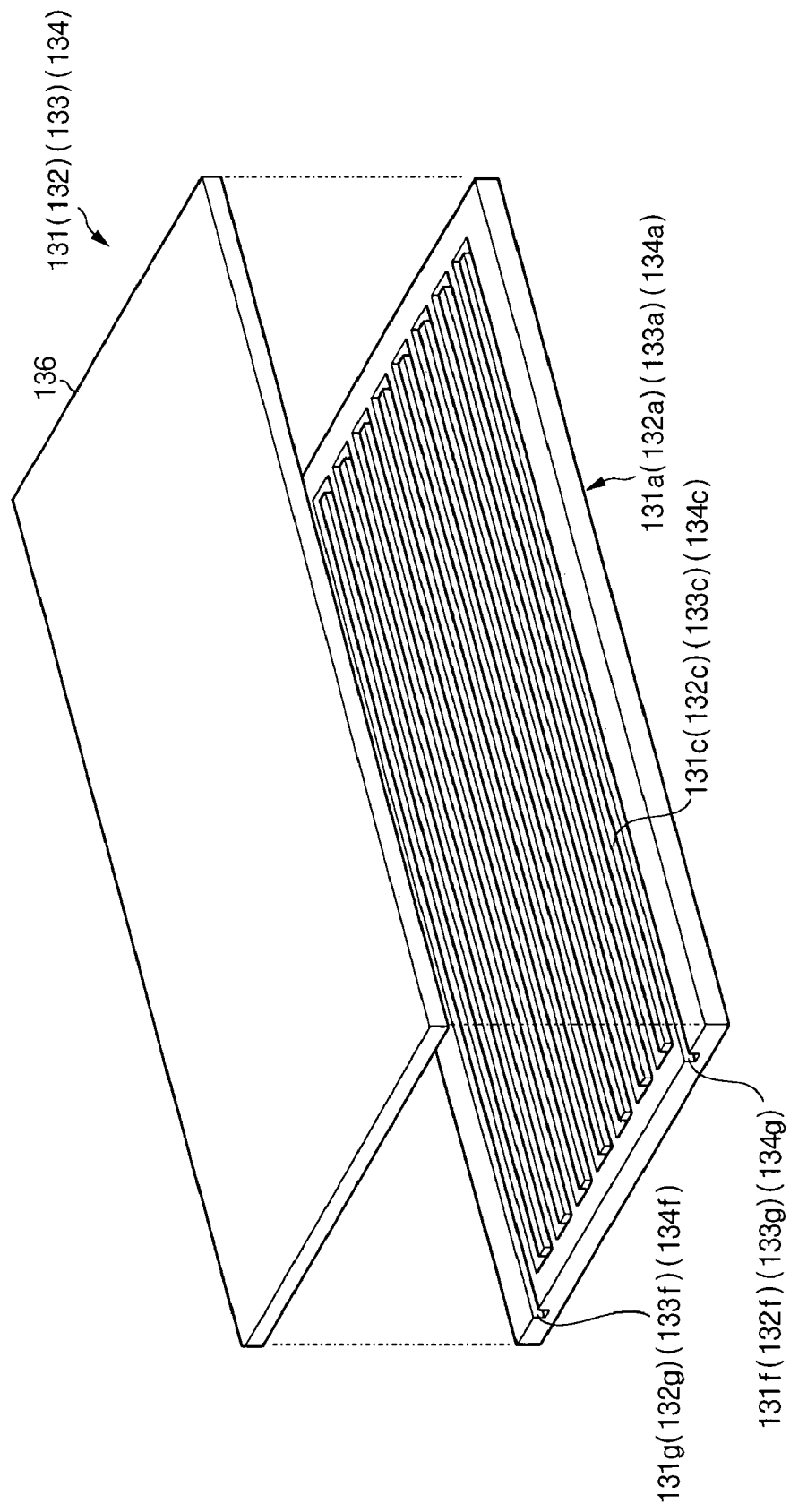
FIG. 7 is an exploded perspective view illustrating a structure of a reformer according to a second modified example of the present invention.

FIG. 7 is an exploded perspective view illustrating a structure of a reformer according to a second modified example of the present invention. FIG. 8 is a coupled cross-sectional view of the reformer shown in FIG. 6.

In the present modified example, the reformer includes the heat source 131, the reforming reactor 132, the first carbon-monoxide reducer 133, and the second carbon-monoxide reducer 134. Since the reaction sections 131, 132, 133, and 134 have the same structure except that different catalyst layers 131e, 132e, 133e, and 134e are formed therein, the reaction sections 131, 132, 133, and 134 are shown as one element in FIG. 7.

In the respective reaction sections 131, 132, 133, and 134, the support layers 131s, 132s, 133s, and 134s and the catalyst layers 131e, 132e, 133e, and 134e are formed on respective inner surfaces of the passages 131d, 132d, 133d, and 134d formed by the respective plates 131a, 132a, 133a, and 134a, in which the channels are formed, and the cover plate 136. That is, unlike the embodiment of FIGS. 2 and 3, in which the plates having the channels formed therein are sequentially stacked, each of the respective reaction sections 131, 132, 133, and 134 independently has a plate 131a, 132a, 133a or 134a or a cover plate 136.

The method of manufacturing the reformer according to the first and second modified examples is substantially the same as the method of manufacturing the reformer 30 according to FIG. 5 and will not be described again.

A reformer according to the present invention may not include the carbon-monoxide reducer and may further include an additional reaction section. The reformer may include a different-structured reaction section along with the above-mentioned plate-shaped reaction sections, which belongs to the scope of the present invention.

While the present invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:

1. A reformer of a fuel cell system comprising:
   a plurality of plates stacked with each other and forming at least one passage having a substantially flat inner surface and adapted to allow a material selected from the group consisting of a fuel and a gas to flow therethrough; and
   at least one catalyst layer coated on the inner surface of the at least one passage,
   wherein the at least one catalyst layer comprises a substantially flat surface corresponding to the substantially flat inner surface of the at least one passage, and an opposite surface having a plurality of grooves and configured to extending substantially in a same direction as a flow direction of the at least one passage and configured to come into contact with the material flowing therethrough.

2. The reformer of claim 1, wherein the at least one passage comprises an inlet adapted to allow the material selected from the group consisting of the fuel and the gas to flow into the at least one passage and an outlet adapted to allow the material selected from the group consisting of the fuel and the gas to flow out from the at least one passage, and wherein the plurality of grooves extend substantially in the same direction as the at least one passage from the inlet to the outlet.

3. The reformer of claim 1, wherein the at least one catalyst layer comprises a plurality of catalyst layers and the at least one passage comprises a plurality of passages, and wherein each of the plurality of catalyst layers is formed on the entire inner surface of a corresponding one of the plurality of passages.

4. The reformer of claim 1, wherein the plurality of plates and at least one catalyst layer constitute a plurality of reaction sections,
   wherein each of the plurality of reaction sections includes a plate of the plurality of plates having a channel, a cover plate of the plurality of plates contacting the plate having the channel to form a passage and a catalyst layer formed on the inner surface of the passage, respectively.

5. The reformer of claim 4, wherein the plurality of reaction sections comprise a heat source adapted to generate thermal energy, a reforming reactor adapted to generate hydrogen gas from the fuel, and a carbon-monoxide reducer adapted to reduce a concentration of carbon monoxide contained in the hydrogen gas.

6. The reformer of claim 1, wherein the at least one catalyst layer comprises a plurality of catalyst layers and the at least one passage comprises a plurality of passages, and wherein a cover plate of the plurality of plates and at least two of the plurality of plates having a channel formed on one surface of each of the at least two of the plurality of plates are stacked to form the plurality of passages and each of the plurality of catalyst layers is formed on the inner surface of a corresponding one of the passages to constitute a plurality of reaction sections.

7. The reformer of claim 6, wherein the plurality of reaction sections include a heat source adapted to generate thermal energy and a reforming reactor adapted to generate hydrogen gas from the fuel.

8. The reformer of claim 7, wherein the plurality of plates include:
   a first plate having a first channel;
   a second plate contacting one surface of the first plate and having a second channel; and
   a cover plate contacting one surface of the second plate, and
   wherein the plurality of catalyst layers include:
   an oxidation catalyst layer formed on the entire inner surface of one of the plurality of passages formed by the first channel and the second plate; and
   a reforming catalyst layer formed on the entire inner surface of another one of the plurality of passages formed by the second channel and the cover plate.

9. The reformer of claim 7, wherein the reaction sections further include at least one carbon-monoxide reducer adapted to reduce a concentration of carbon monoxide contained in the hydrogen gas.

10. The reformer of claim 9, wherein the plurality of plates include:
   a first plate having a first channel;
   a second plate contacting one surface of the first plate and having a second channel;
   a third plate contacting one surface of the second plate and having a third channel;
   a fourth plate contacting another surface of the first plate and having a fourth channel; and a cover plate contacting one surface of the third plate, and wherein the plurality of catalyst layers include:

an oxidation catalyst layer formed on the entire inner surface of a first one of the plurality of passages formed by the first channel and the second plate;

a reforming catalyst layer formed on the entire inner surface of a second one of the plurality of passages formed by the second channel and the third plate;

a water-gas shift catalyst layer formed on the entire inner surface of a third one of the plurality of passages formed by the third channel and the cover plate; and a preferential CO oxidation catalyst layer formed on the entire inner surface of a fourth one of the plurality of passages formed by the fourth channel and the first plate.

* * * * *

UNITED STATES PATENT AND TRADEMARK OFFICE
CERTIFICATE OF CORRECTION

PATENT NO. : 7,763,220 B2  
APPLICATION NO. : 11/166353  
DATED : July 27, 2010  
INVENTOR(S) : Zin-Min Park et al.

Page 1 of 1

It is certified that error appears in the above-identified patent and that said Letters Patent is hereby corrected as shown below:

Column 11, Claim 1, line 55         Delete "grooves and configured to", Insert -- grooves --

Signed and Sealed this
Fourth Day of October, 2011

David J. Kappos
*Director of the United States Patent and Trademark Office*